2,712,027
ALLOPREGNANE-3β,11α,20β-TRIOLS AND PROCESS

George Rosenkranz and Jesus Romo, Mexico City, Mexico, Gilbert Stork, Cambridge, Mass., and Carl Djerassi, Birmingham, Mich., assignors to Syntex S. A., Mexico City, Mexico, a corporation of Mexico No Drawing. Application June 3, 1952,
Serial No. 291,555

Claims priority, application Mexico June 9, 1951

6 Claims. (Cl. 260—397.45)

The present invention relates to novel allopregnane-3β,11α,20β-triols and a process for the production thereof. More particularly the present invention relates to novel 11α hydroxy steroids and a process for producing these steroids from the corresponding $\Delta^{8(9)}$-7-keto-11α-hydroxy-steroids.

Compounds of the character described in the present application are of special importance as intermediates for the production of cortisone as the various 17 side chains may be readily converted to the cortisone side chain, the compounds may also be provided with the 3-keto $\Delta^4$ structure in ring A by known methods, and the 11α hydroxy group may also be oxidized to the 11 keto group as hereinafter set forth.

Although it has been previously set forth in the literature (Barton and Cox, Jour. Chem. Soc. 214, 1949) that the double bond in the 8(9) position of the cyclopentanophenanthrene molecule cannot be hydrogenated, in accordance with the present invention it has been discovered that in the presence of a suitable catalyst such as a palladium catalyst, the 8(9) double bond may be hydrogenated when there is present a 7 keto group and especially an 11α hydroxy and a 7 keto group.

There has therefore been discovered a novel method for converting $\Delta^{8(9)}$-7-keto-11α-hydroxy-steroids of the type disclosed for example in the copending application of Djerassi and Rosenkranz, Serial No. 226,534, now abandoned, into the novel corresponding saturated 7-keto-11α-hydroxy steroids. Further in accordance with the present invention it has been discovered that Wolff-Kishner reduction of these last mentioned compounds produces the corresponding novel 11α-hydroxy compounds which may be readily oxidized to the corresponding novel 11-keto compounds.

The process of the present invention may be exemplified by the following equation:

Although in the above equation a compound of the allopregnene series has been shown by way of example, namely $\Delta^{8(9)}$-allopregnen-3β, 11α, 20β-triol-7-one, other $\Delta^{8(9)}$-11α-ol-7-one steroids may be used including steroids having a normal configuration at position 5 and other 17 or 16, 17 side chains characteristic of steroids. Examples of other 17 side chains are those with a 20-keto group rather than the 20 hydroxy group shown or compounds having side chains at 16—17 characteristic of the sapogenins whether 22-normal or 22-iso spirostens. In each case the corresponding novel compounds having the nuclear structures exemplified above are produced.

The process above outlined may be practiced by dissolving $\Delta^{8(9)}$-7-keto-11α-hydroxy steroid in a suitable inert organic solvent such as ethanol and shaking the solution in a hydrogen atmosphere with a suitable hydrogenation catalyst such as palladium-charcoal. After a short period such as 2 hours hydrogen consumption ceased and suitable purification (removal of catalyst by filtration, crystallization from an inert organic solvent, etc.) gave the corresponding 11α-hydroxy-7-one compound.

The 11α-hydroxy-7-one steroid produced in accordance with the step of the process just outlined could then be treated to eliminate the 7-keto group according to the Wolff-Kishner method and more particularly by the modification of the method disclosed by Huang-Minlon in U. S. Patent 2,471,697, whereby the steroid is first refluxed in a glycol solvent such as ethylene glycol with hydrogine hydrate for about 2 hours. Thereafter an alkali metal hydroxide such as potassium hydroxide in water is added and the mixture heated in an open flask until a vapor temperature of about 190° C. is reached. A reflux condensor is then attached and the mixture refluxed for a further period of about 4 hours. The product is then precipitated by pouring the reaction mixture into cold water and purified by crystallization from a suitable solvent such as methanolacetone.

To form the corresponding 11 keto compound or the 3, 11-diketo compound, where a 3 hydroxy group is also present, or the 3, 11, 20-triketo compound, where a 3 and 20 hydroxy are also present, the 11-hydroxy compound is oxidized, preferably with chromic acid in the presence of acetic acid.

The following specific examples serve to illustrate but are not intended to limit the present invention.

Example I

A solution of 1 g. of $\Delta^{8,9}$-allopregnen-3β,11α,20β-

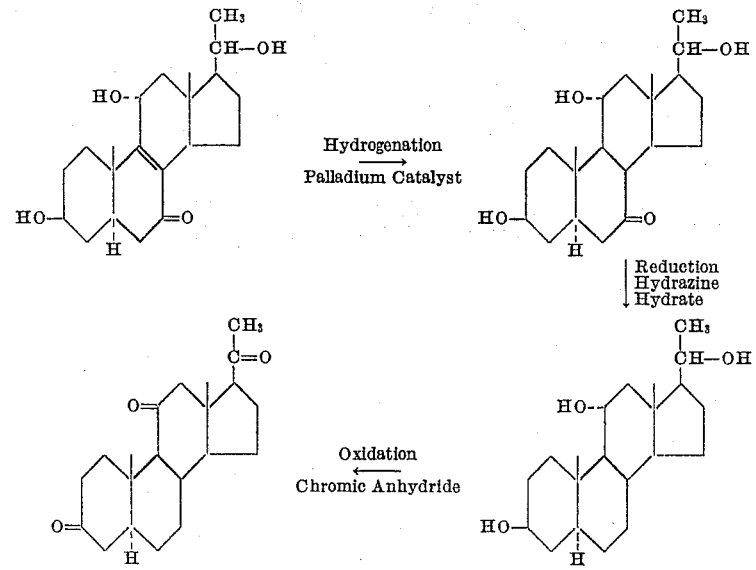

triol-7-one in 100 cc. of absolute ethanol was shaken during 2 hours in an atmosphere of hydrogen at room temperature and atmospheric pressure with 100 mg. of palladium-charcoal catalyst. The consumption of hydrogen ceased when the equivalent of one mol of hydrogen had been absorbed. The catalyst was removed by filtration and the solution evaporated to dryness. The residue was crystallized from methanolacetone to give colorless crystals of allopregnan-3β,11α,20β-triol-7-one M. P. 246–248° C., $[α]_D$—112 (alcohol), the ultraviolet spectrum showed no selective absorption in contrast with the starting material.

Example II

Working under the same condition as described in Example I, except that palladium on barium sulphate was used instead of palladium on charcoal, the same compound was obtained as in Example I.

Example III

A solution of 730 mg. of allopregnan-3β,11α,20β-triol-7-one (obtained according to Example I) in 20 cc. of ethylene glycol was refluxed for one hour with 0.8 cc. of 85% hydrazine hydrate. The solution was cooled and 1.5 g. of potassium hydroxide in 2 cc. of water were added. The mixture was heated in an open flask until the temperature of the escaping vapors reached 190° C., a reflux condenser was then attached and the mixture refluxed during 4 additional hours. It was poured in water and the precipitate was collected and washed with water. On crystallization from methanol-acetone it gave colorless crystals of allopregnan-3β,11α,20β-triol, M. P. 253–255° C., $[α]_D$—18.6 (alcohol). The compound does not show the characteristic infrared band of keto groups.

Acetylation by known methods afforded allopregnan-3β,11α,20β-triol triacetate, which on crystallization from dilute methanol gave needles with M. P. 162–164° C., $[α]_D$—15.8 (chloroform). This triacetate did not exhibit the characteristic infrared band of free hydroxy groups.

Example IV

A solution of 400 mg. of chromic anhydride in 1 cc. of water and 6 cc. of acetic acid was slowly added to a solution of 400 mg. of allopregnan-3β,11α,20β-triol in 20 cc. of acetic acid. After standing at room temperature for two hours the mixture was poured in water and extracted with ether, washed, dried over sodium sulphate and evaporated to dryness. The residue was crystallized from acetone-hexane to yield colorless crystals of allopregnan-3,11,20-trione, M. P. 211–213° C., $[α]_D$+128 (alcohol). This compound does not exhibit the typical infrared bands of free hydroxy groups.

Example V

A solution of 1 g. of $Δ^8$-22-isoallospirosten-3β,11α-diol-7-one in 100 cc. of absolute alcohol was hydrogenated at room temperature and atmospheric pressure with 200 mg. of palladium-charcoal catalyst which had been previously reduced. When the reaction ceased after 90 minutes, the equivalent of one mol of hydrogen had been absorbed. The catalyst was filtered and the solution was evaporated to dryness and the residue crystallized from acetone to give 22-isoallospirostan-3β,11α-diol-7-one, M. P. 236–237° $[α]_D$—126° (chloroform). This compound has no selective absorption in the ultraviolet, thus proving that the double bond has been hydrogenated. The infrared spectrum shows a band at 1702 cm.$^{-1}$, characteristic of isolated carbonyl groups.

Example VI

A solution of 500 mg. of 22-isoallospirostan-3β,11α-diol-7-one in 15 cc. of ethylene glycol was heated with 2 cc. of 85% hydrazine hydrate during one hour. 0.9 g. of potassium hydroxide at 2 cc. of water were added to the cooled solution and the mixture was heated in an open flask until the temperature of the escaping vapors reached 190°. A reflux condenser was attached and the mixture refluxed during four additional hours. After pouring in water, the precipitate was collected and washed until neutral. This precipitate of 22-isoallospirostan-3β,11α-diol is of gelatinous consistency and has a great tendency to retain the solvent, but it can be recrystallized from acetone to yield the 22-isoallospirostan-3β,11α-diol, M. P. 217–218° C., $[α]_D$—71° (chloroform). Conventional acetylation gave 22-isoallospirostan-3β,11α-diol diacetate, M. P. 172–175° C.

Example VII 1.5 g. of $Δ^{8(9)}$-allopregnan-3β,11α-diol-7,20-dione were dissolved in 40 cc. of ethanol and hydrogenated at room temperature and atmospheric pressure in the presence of 100 mg. of palladium-charcoal catalyst which had been previously reduced. Approximately one mol of hydrogen was absorbed in the course of 2 hours. The catalyst was filtered and the solution evaporated to dryness. The residue crystallized from acetone-hexane to give allopregnan-3β,11α-diol-7,20-dione, M. P. 240–241°, $[α]_D$—15.5 (chloroform). The substance showed no selective absorption in the ultraviolet.

The compound thus obtained was acetylated by the acetic anhydride-pyridine method to give allopregnan-3β,11α-diol-7,20-dione diacetate, M. P. 156–157°, $[α]_D$±0 (chloroform).

We claim:

1. A process for the production of 7-keto-11α-hydroxysteroids which comprises selectively hydrogenating a corresponding $Δ^{8(9)}$-7-keto-11α-hydroxy steroid in the presence of a palladium catalyst.

2. The process of claim 1 wherein the 7-keto-11α-hydroxy steroid is allopregnan-3β,11α,20β-triol-7-one.

3. A new compound consisting of allopregnan-3β,11α,20β-triol-7-one having a M. P. of 246–248° C.

4. A process for the production of 3,11-diol steroids which comprises subjecting the corresponding 3β,11α-diol-7-one steroids to reduction with hydrazine hydrate.

5. A new compound consisting of allopregnan-3β,11α,20β-triol having a M. P. of 162–164° C.

6. A new compound consisting of allopregnane-3β,11α,20β-triol triacetate having a M. P. of 162–164° C.

References Cited in the file of this patent

UNITED STATES PATENTS 2,602,769   Murray et al. _____ July 8, 1952

OTHER REFERENCES

Barton et al., Jour. Chem. Soc. (1949).
Steiger et al., Helv. Chem. Acta 21, 161–171 (1938).